United States Patent [19]

Kenney

[11] 4,236,083
[45] Nov. 25, 1980

[54] WINDMILL HAVING THERMAL AND ELECTRIC POWER OUTPUT

[76] Inventor: Clarence E. Kenney, 119 Stuart Rd., Racine, Wis. 53406

[21] Appl. No.: 551,130

[22] Filed: Feb. 19, 1975

Related U.S. Application Data

[63] Continuation-in-part of Ser. No. 416,939, Nov. 19, 1973, abandoned.

[51] Int. Cl.² .............................................. F03D 9/00
[52] U.S. Cl. .......................................... 290/55; 290/44
[58] Field of Search ............................. 290/55, 54, 44

[56] References Cited

U.S. PATENT DOCUMENTS

| | | | |
|---|---|---|---|
| 1,010,591 | 12/1911 | Clements | 290/55 |
| 1,366,844 | 1/1921 | Snee, Jr. | 290/44 |
| 2,106,557 | 1/1938 | Putnam | 290/44 |
| 2,230,526 | 2/1941 | Claytor | 290/55 |
| 2,329,675 | 9/1943 | Albers | 290/44 |
| 2,539,862 | 1/1951 | Rushing | 290/44 |
| 2,652,699 | 9/1953 | Romani | 290/55 |
| 3,806,733 | 4/1974 | Haanen | 290/55 |

*Primary Examiner*—Robert S. Macon
*Attorney, Agent, or Firm*—Arthur J. Hansmann

[57] ABSTRACT

A windmill having thermal and electric power output and including windmill blades rotatably mounted and connected to a speed increaser mechanism of gears and shafts and a centrifugal compressor connected to the windmill thru the speed increaser to be driven by virtue of the wind applied to the blades of the windmill itself. A directional control is connected to the windmill head to have the windmill blades face into the wind, as desired. The compressor is connected to an insulated heat storage tank which contains storage material, such as brick, and the compressor discharge velocity and pressure difference are converted to heat, and the compressor fluid is returned to the compressor thru a screen which protects the compressor, and there is a flow control which automatically compensates for changes in density of the circulated air or compressor fluid. Also, a gas turbine generator can be connected with the compressor to be driven thereby, and electric elements could be connected with the generator for producing electricity. Two other embodiments show an impeller type of air brake and a valve and a heat-sensitive control, for generating heat or power.

6 Claims, 16 Drawing Figures

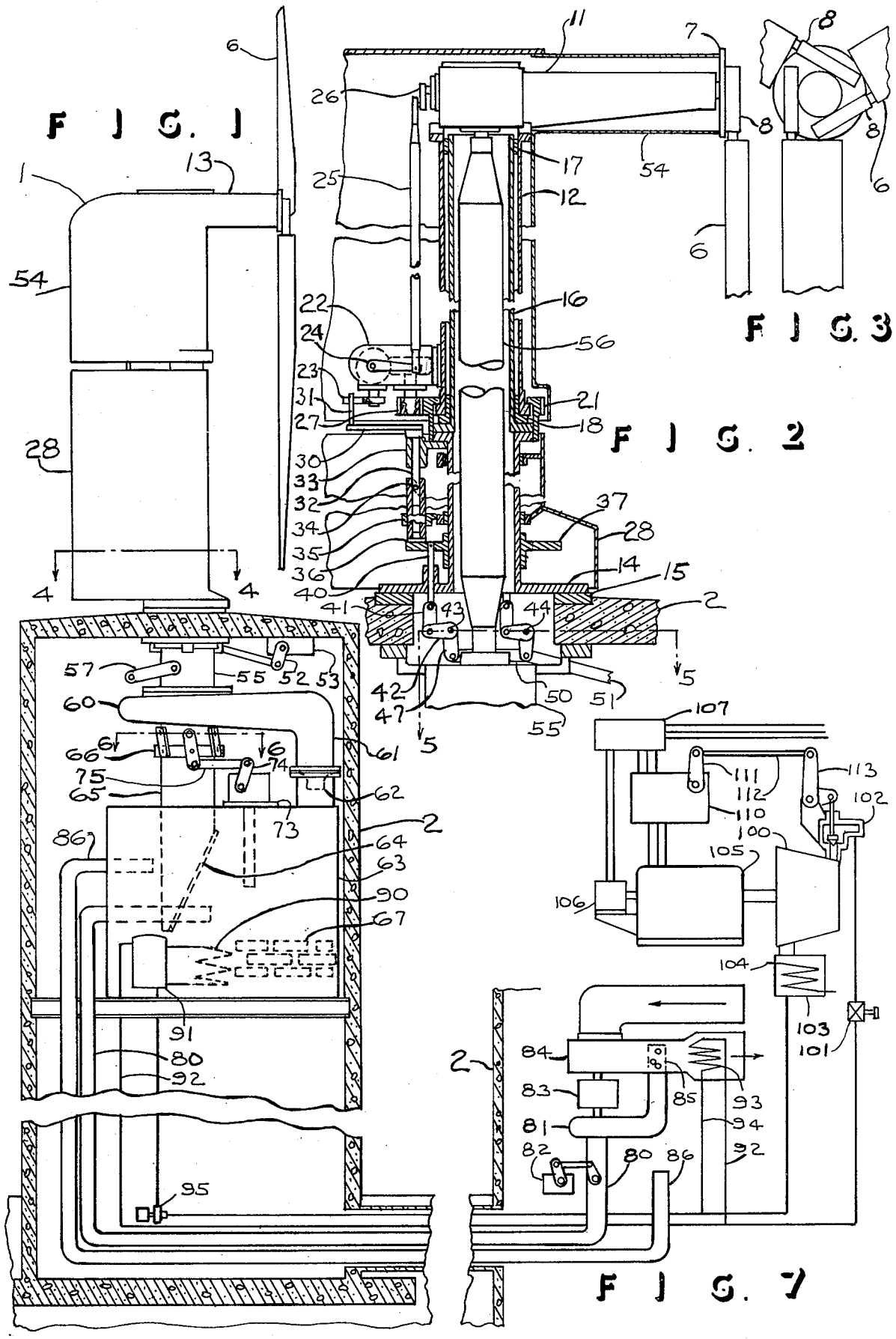

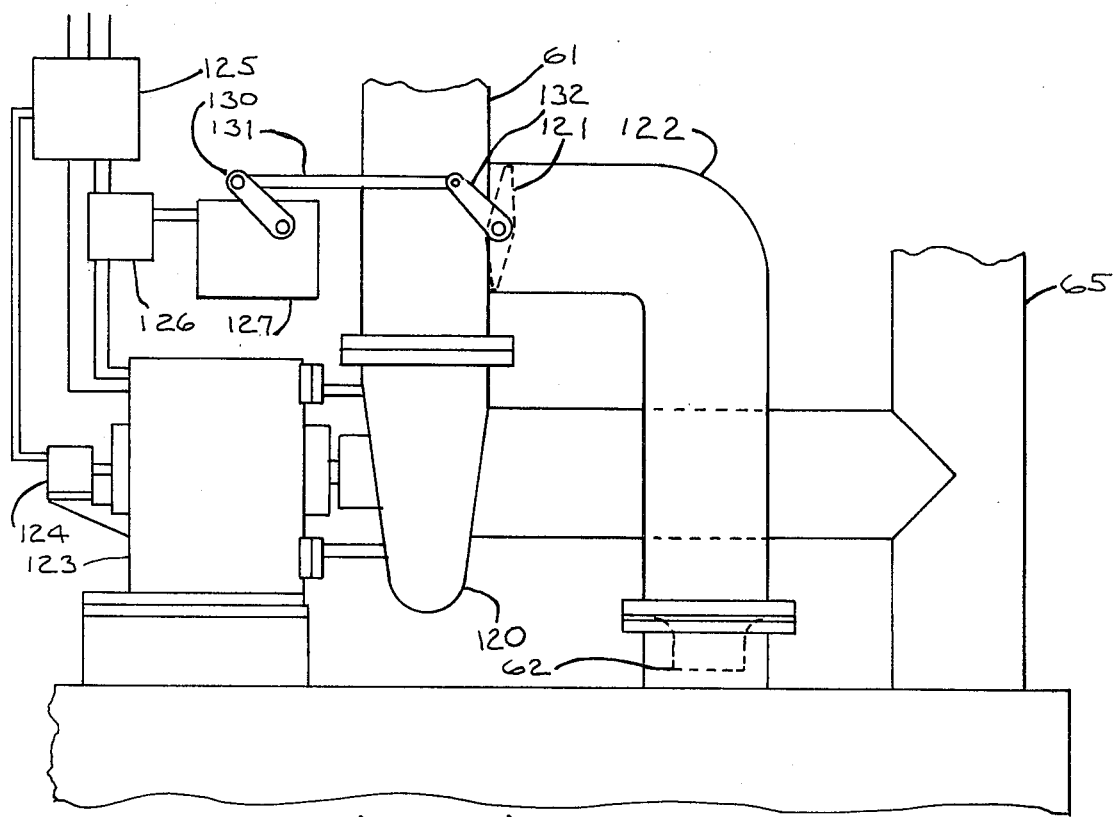
FIG. 8
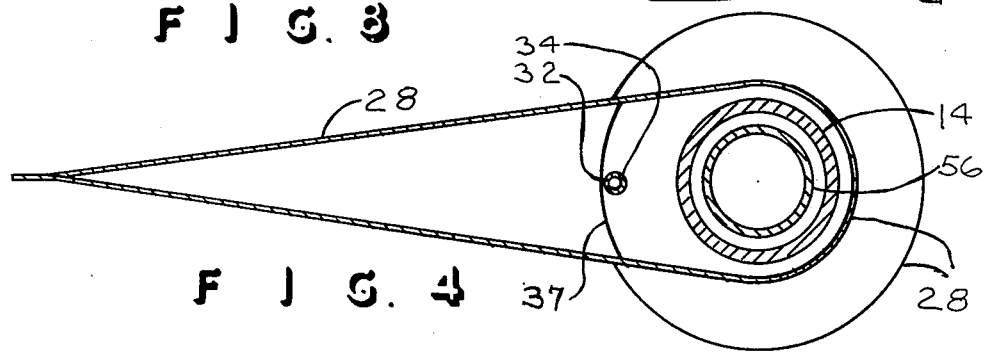
FIG. 4
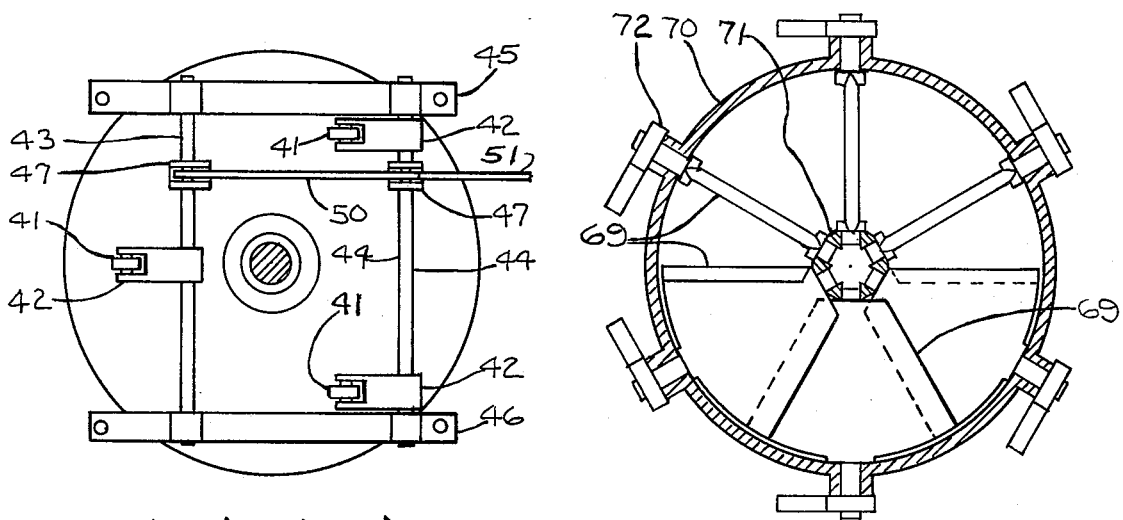
FIG. 5
FIG. 6

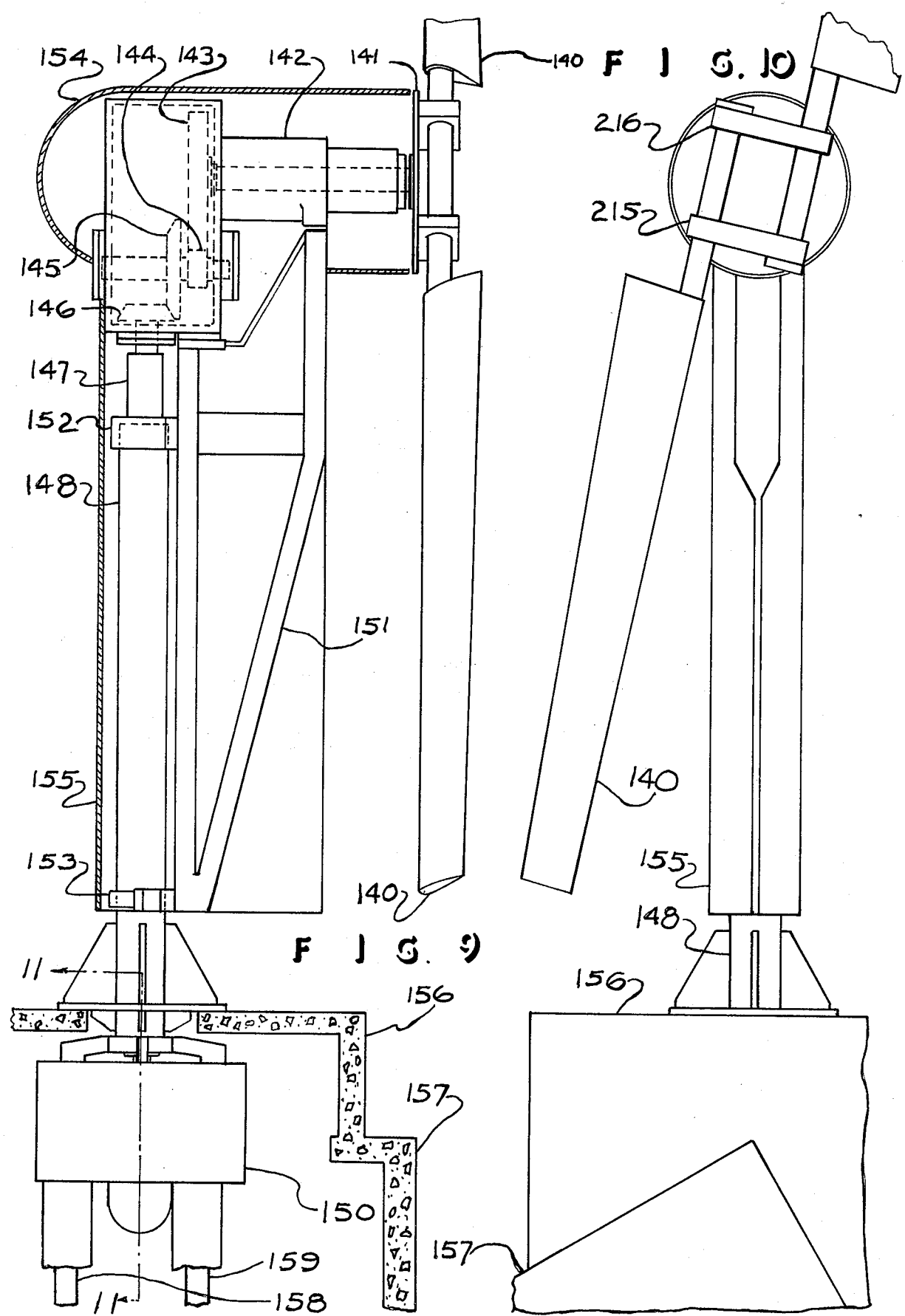

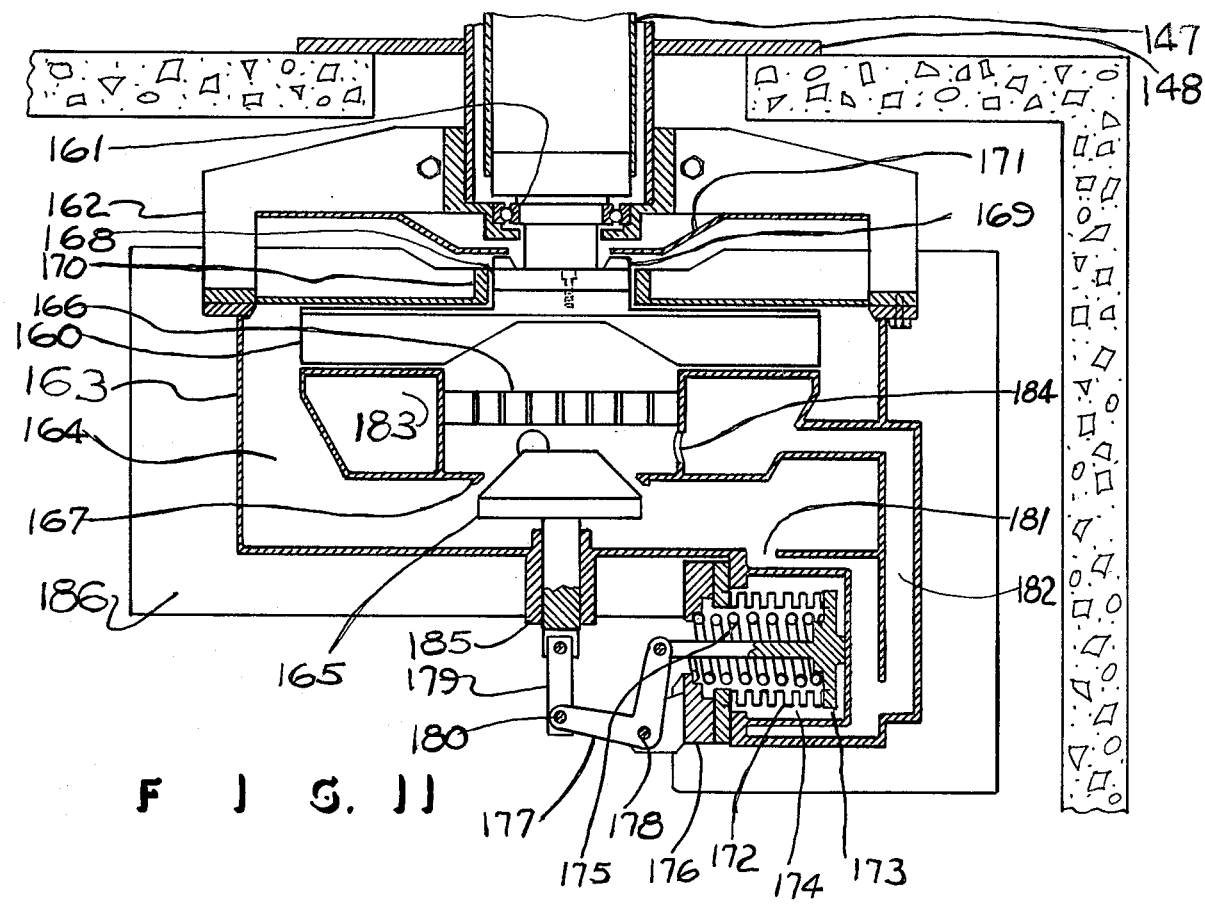
FIG. 11
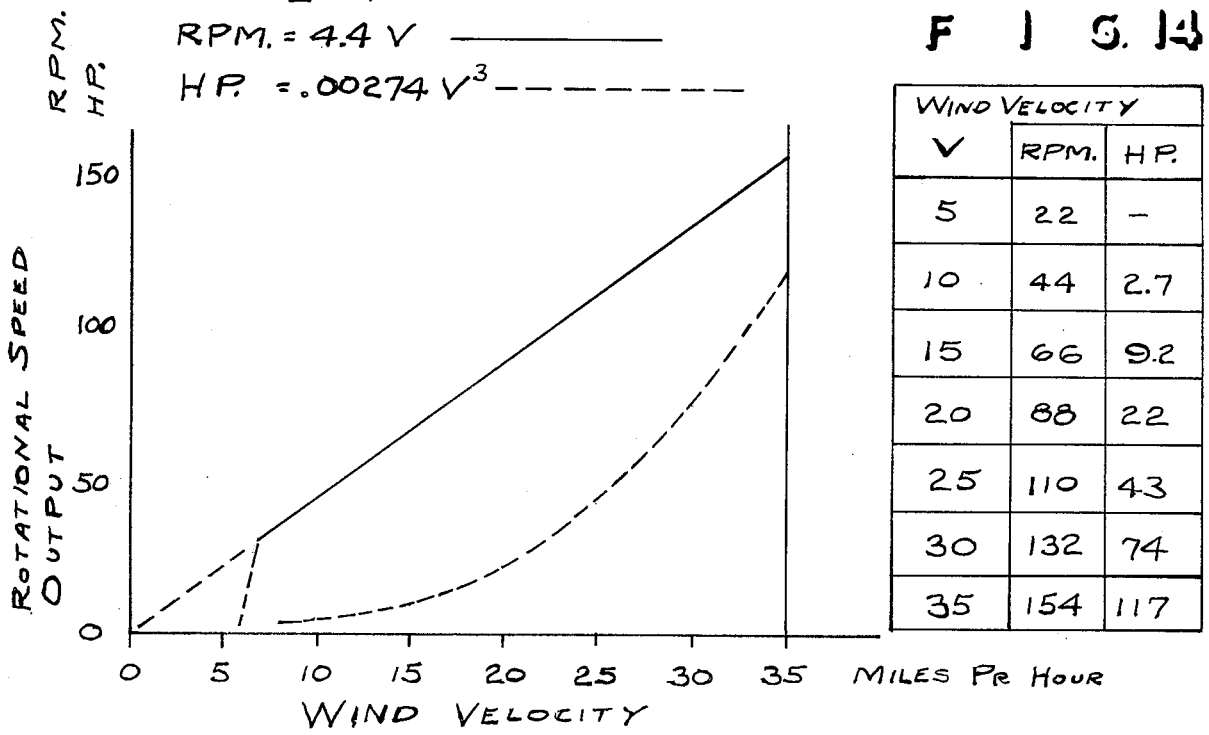
FIG. 13
32 FT. DIA. WINDMILL
RPM. = 4.4 V ———
H.P. = .00274 V³ - - - - - -
FIG. 14
| WIND VELOCITY | | |
|---|---|---|
| V | RPM. | H.P. |
| 5 | 22 | — |
| 10 | 44 | 2.7 |
| 15 | 66 | 9.2 |
| 20 | 88 | 22 |
| 25 | 110 | 43 |
| 30 | 132 | 74 |
| 35 | 154 | 117 |

FIG. 12
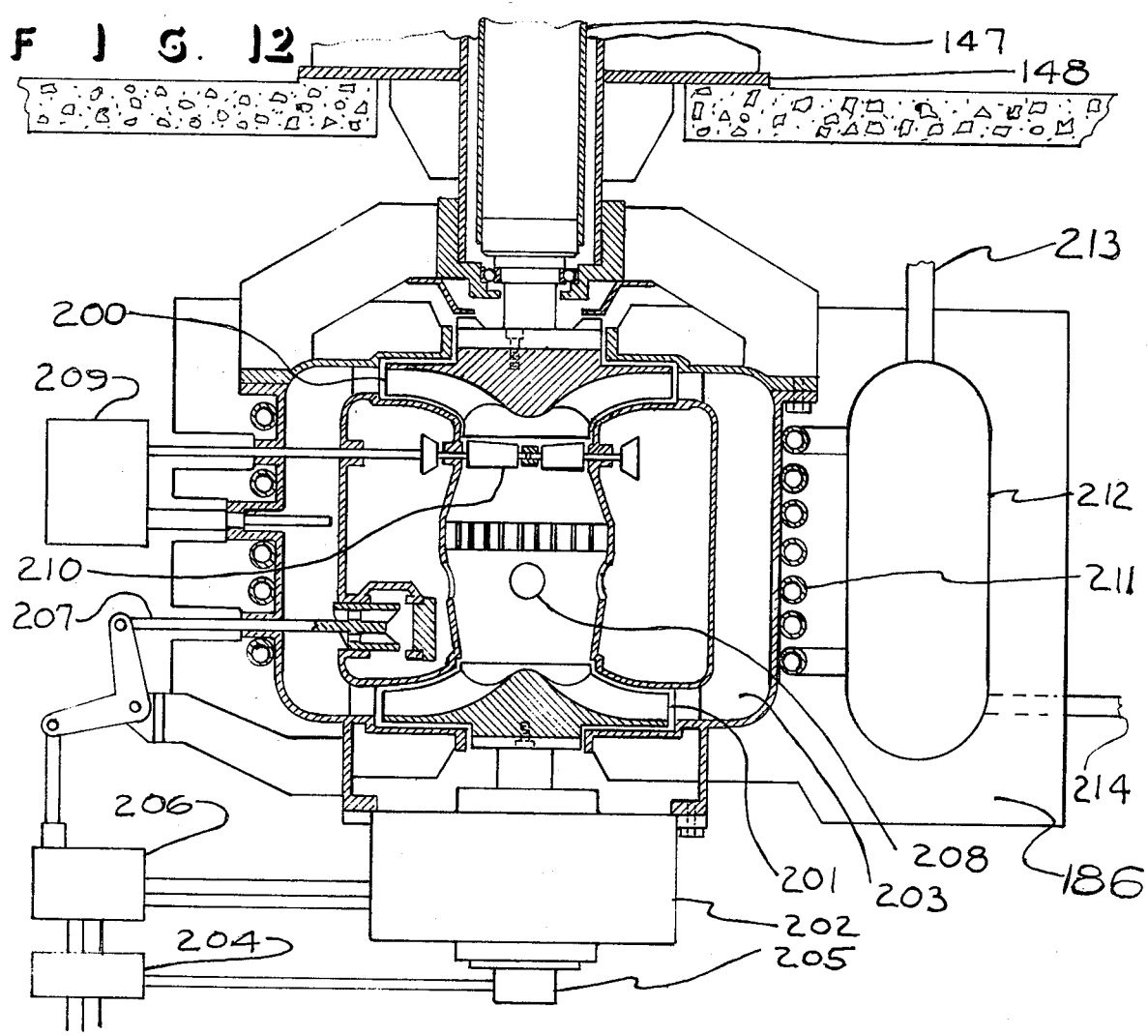
FIG. 13
200 FT. DIA. WINDMILL
RPM = .7V
Kw.T. = Kw. To Transmission
Kw.G. = Kw. To Gen. = .75 Kw.T.
Kw.H. = Equivalent Kw. To Heat
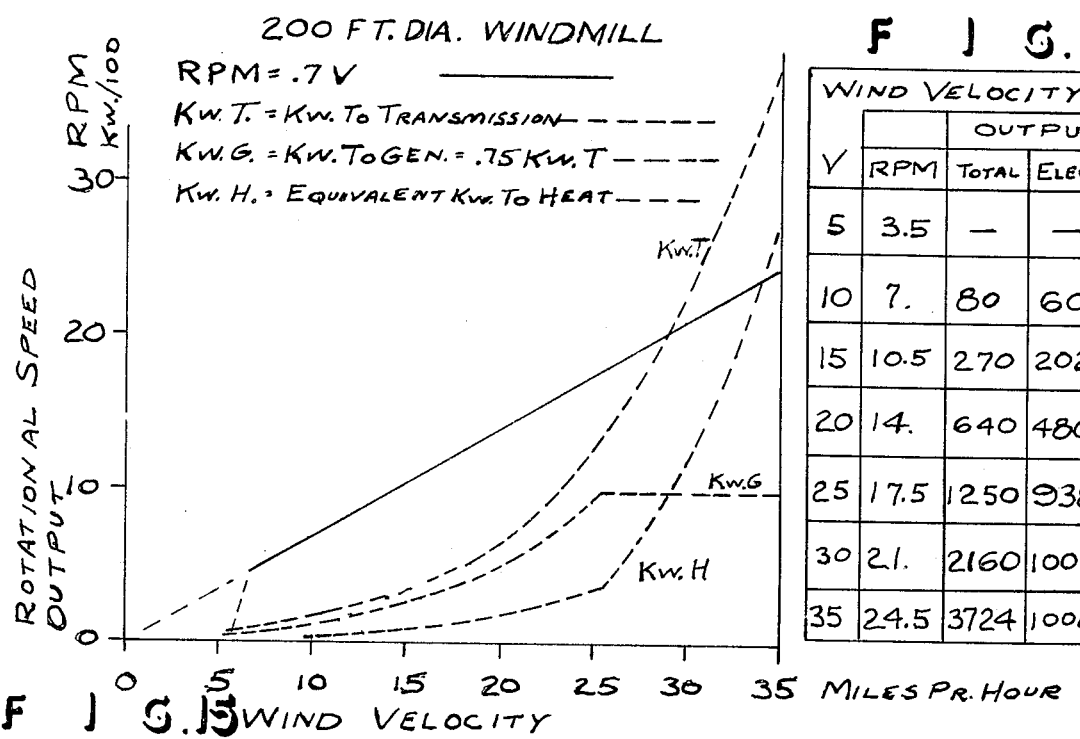
FIG. 13
WIND VELOCITY
| V | RPM | OUTPUT Kw. | | |
|---|-----|-------|-------|------|
|   |     | TOTAL | ELECT.| HEAT |
| 5 | 3.5 | — | — | — |
| 10 | 7. | 80 | 60 | 20 |
| 15 | 10.5 | 270 | 202.5 | 67.5 |
| 20 | 14. | 640 | 480 | 160 |
| 25 | 17.5 | 1250 | 938 | 312 |
| 30 | 21. | 2160 | 1000 | 1160 |
| 35 | 24.5 | 3724 | 1000 | 2724 |

4,236,083

WINDMILL HAVING THERMAL AND ELECTRIC POWER OUTPUT

This invention relates to a windmill having both thermal and electric power output and, more particularly, it relates to utilization of a windmill for purposes of heating buildings, generating electric power, and storing the output of the windmill itself. This is a continuation-in-part of U.S. Patent Application Ser. No. 416,939, filed Nov. 19, 1973 now abandoned, entitled Windmill Having Thermal and Electric Power Output.

BACKGROUND OF THE INVENTION

Windmills which are already known exist in various sizes and employ airfoil blades to drive an electric power generator through speed increasing gears. Those windmills are also arranged to feather the blades or to provide some energy absorbing means to drive the electric generator at or near a constant speed. Because it is not economical to provide a generator which is large enough to use the output of the windmill at high wind velocities which only rarely exist, and because the electric generator must be driven at a constant speed, the power of the high wind velocities is wasted. Also, windmill generating sets generate power only when the wind is available.

The object of the present invention is to provide a windmill which is less expensive to build and to maintain, compared to those heretofore known, and which is capable of converting the high wind velocities to usable energy.

Another object of this invention is to provide a windmill which includes means for storing the energy so that, for instance, the energy obtained during high wind velocities is available for use when there is no wind.

Another object of this invention is to provide a windmill energy converting system wherein energy of winds down to a low velocity can be converted to energy, such as by driving a centrifugal pump or an elastic fluid compressor, either of which requires input power in proportion to the cube of rotational speed, the same proportion in which power is developed by a windmill having non-feathering air foil blades, with rotational speed proportional to the wind velocity. In this instance, the converted energy is in turn converted to heat by restrictions to flow of the fluid, achieving this by having the windmill drive a blower which circulates air through a heat storage tank wherein the storage material can be a solid, such as brick. In accomplishing this object, heat can be generated for any of the purposes now commonly supplied by fossil fuel, and the heat can be supplied both when the wind is blowing and when there is no wind.

Further, windmills of all diameters can be of a similar design. A support is included in the construction and is rotatable relative to the direction of the wind and carries the air foil blades which are therefore directed. Controls are provided and adequately located so that there will be a reduction in the otherwise irregularities in air velocity to the rotating blades so that the blades will not be damaged by fatigue.

With the structure of this invention, where the unit is used for heating a residence, of say 1,200 square feet, there can be enough storage of heat to maintain a comfortable living temperature within the house for three to five days in zero outdoor temperature weather conditions without addition of heat from the wind.

Further, there can be a steam generating system operated by the windmill and it can be used both for heating and cooling of buildings, according to the arrangements of this invention. Still further, there can be a steam turbine operated by the steam produced from the windmill of this invention. A gas turbine can be operated on the intake or suction side of a compressor which is in the system, and the turbine can operate a generator and an objective is to have a reliable and economic system.

Existing large windmills usually drive generators connected to and supplementing established power sources at constant speed. Existing small windmills drive DC or AC generators at variable speed. Few references are made to windmills, driving pumps or compressors. Among these, U.S. Pat. No. 2,539,862 and U.S. Pat. No. 3,806,733, describe windmills conncted by gears to drive both positive displacement pumps and centrifugal compressors. In each case the pump or compressor must deliver fluid against a pressure higher than suction to drive a prime mover and, thru it, a generator or other mechanical output, or it must force the fluid into a storage vessel.

A positive displacement pump with pressure difference across it requires starting torque proportional to the pressure across it plus friction of the pump. An efficient windmill with one to three airfoil blades, develops low starting torque and cannot be designed to start and efficiently drive a positive displacement pump.

The piping connections of a centrifugal pump delivering fluid at a pressure higher than suction, must include a check valve to prevent flow back thru the pump when it is stationary or running below operating speed. A windmill and gear set designed to operate such a pump at a normal operating speed, will be lightly loaded from low wind velocity to a wind velocity corresponding to the pump speed at which fluid is discharged. Both the pump output and system efficiency are zero in this range of wind velocities. The wind will flow over the blade sections at low angles of attack and rotational speed of the windmill will be higher than that at which maximum power is recovered from the wind. When the pump is driven at speeds within its operating range, delivering fluid against substantially constant pressure, driving torque will increase rapidly with respect to speed.

This invention describes an air brake enclosed in an insulated housing to contain the heat resulting from absorption of energy by the brake and with provision to deliver the heat generated to storage or to use. A centrifugal impeller moves gas thru a short path of constant dimensions. Power required to rotate the shaft is proportional to the cube of rotational speed. When the brake is driven by a windmill thru a speed increaser of ratio required to match the windmill to the brake, the windmill will rotate at those speeds proportional to wind velocity within a safe operating range. The windmill will recover maximum energy from these winds.

This application of a centrifugal impeller in an enclosure within which it moves fluid thru a path of fixed geometry, results in a smooth curve of torque-speed relation. It cannot be compared to a pump in which fluid must be discharged against a fixed head in which applications the curve of torque versus speed is discontinuous.

Mechanical energy recovered from wind and converted to heat is as effective in conserving fossil fuel as is the generation of electricity. The windmill of this invention is loaded by a brake which converts the mechanical energy directly to heat. It will cost less and will convert more of the energy of available winds in any geographic location to heat than a comparable windmill driving a generator. This windmill will require less maintenance and will last longer. Heat can be generated by the direct conversion of mechanical energy at a temperature limited only by the strength of the materials used to construct the brake. Storage of heat in rock has become recognized practice for heat recovered directly from solar radiation. Heat recovered from the wind either thru a generator or by direct conversion can be at higher temperature than direct solar heat and more can be stored in a given volume. Heat stored at high temperature can be converted to steam for distribution, can efficiently energize an absorption cooling system, heat service water and cook as appliances become available. A thermoelectric generator can supply electricity from stored heat upon demand without loss, if the air cooling the generator is used to heat a home.

A pneumatic transmission, equivalent in principal to the brake, capable of driving a generator at constant speed will be economical as a load for large windmills. Loss in the transmission and energy which the windmill can recover in excess of that required to drive a generator of economic rating, will be converted to heat. Thus windmills of all diameters according to this invention will economically recover the energy of winds to a higher operating velocity than equivalent windmills driving generators.

Other objects and advantages will become apparent upon reading the following description in light of the accompanying drawings.

BRIEF DESCRIPTION OF THE DRAWINGS

FIG. 1 is a side elevational view of a preferred embodiment of this invention and with the base portion being shown in section.

FIG. 2 is a side elevational view of the upper portion of the embodiment shown in FIG. 1, and being in section.

FIG. 3 is a front elevational view of a fragment of FIG. 2.

FIG. 4 is a sectional view taken on the line 4—4 of FIG. 1.

FIG. 5 is a view of a portion of FIG. 2 and with the view being taken along the line 5—5 of FIG. 2.

FIG. 6 is a sectional view taken on the line 6—6 of FIG. 1.

FIG. 7 is a side elevational view of apparatus used in connection with the embodiment shown in FIG. 1.

FIG. 8 is a side elevational view of an electric power generating set which can be used in connection with the embodiment shown in FIG. 1.

FIG. 9 is a side elevational view, partly in section, of another embodiment of the windmill of this invention.

FIG. 10 is a front elevational view of FIG. 9.

FIG. 11 is a enlarged sectional view taken along the line 11—11 of FIG. 9.

FIG. 12 is a view similar to FIG. 11, but showing still another embodiment of that shown in FIG. 11.

FIGS. 13-16 are graphs and tables of statistics.

DETAILED DESCRIPTION OF THE PREFERRED EMBODIMENT

The windmill shown generally as 1 of FIG. 1, is mounted on a base 2, raising it above nearby obstructions to wind flow. The base is in section to show means provided to load the windmill. Detailed construction of the windmill is described with reference to the enlarged vertical section FIG. 2. Three blades 6 are rigidly attached to a disc 7, the number of blades is not part of this invention. FIG. 3 shows brackets 8 which are part of disc 7 holding the blades. Each blade is of airfoil section. The sections from center to tip are twisted to maintain a constant angle of attack with the wind relative to the blade. The windmill is designed to run at rotational speed proportional to wind velocity in all winds up to a safe high velocity limit in order to develop maximum energy from the wind. The blade disc 7 is part of the low speed shaft of a geared speed increaser shown generally as 11 which is supported on a tubular guide 12. The blade disc, gear set, guide and parts attached to it are shown generally at 13 and will be referred to as the windmill head 13. The gear set 11 is of a conventional design and includes a set of spiral bevel gears similar to those of an automotive rear end. The windmill head 13, is rotationally supported on two sections of a cylindrical support. The lower section 14 is bolted to a base plate 15 which is securely fastened to the base 2. The lower section of support 16 is secured to the upper section of support 14 by mating flanges as shown. The upper support carries the windmill head 13 on a guide bearing 17 and a combined guide and thrust bearing 18. A projection of the ring gear 21 secured to the flanges of support 14 and 16, limits upward movement of the windmill head. A relatively small gear set is included in housing 22 bolted to the guide 12 and includes an input worm gear and an output worm wheel of any conventional design and of such ratio that the worm wheel cannot drive the input worm gear. The input worm gear is free on the input shaft except as connected to it by either of two uni-directional clutches which are engaged by rotation of a control lever 23. The input shaft of the gear unit 22 is rotated in an ocillatory fashion whenever the windmill rotates, by a lever 24, connecting rod 25 and a crank 26 mounted on a rearward extension of the low speed shaft of the gear set. A pinion gear 27 mounted on the worm wheel shaft of gear set 22 engages the ring gear 21 and, because the gear set 22 is not reversible, locks the windmill head in rotational position when the clutch control lever 23 is in its neutral position. A light streamlined vane 28, shown sectioned in FIG. 4, rotates on the support 14 to align with the direction of the wind.

In normal operation of the windmill, a lever 30 is supported on the vane 28 and held in alignment with the vane center line. Lever 30 includes a projection 31 which engages a slot in the control lever 23 of gear set 22. If wind direction should change to rotate the vane 28 clockwise looking downward, the control lever 23 will rotate to engage the correct clutch of gear set 22 turning the pinion gear 27 to rotate the windmill head 13 clockwise to align with the new position of the vane 28. An opposite change in wind direction will result in engagement of the second clutch within the gear set 22 to rotate the pinion in the opposite direction and stop when the windmill head is again aligned with the vane 28 and therefore with the wind. If the wind velocity should decrease to zero and then increase in any direction, even from behind the windmill head, the vane will rotate control 23 to engage the correct clutch to rotate the windmill head to face the new direction of wind.

A control is provided whereby the lever 30 can be held at any angle up to 90° to its normal position in line with the vane 28. The windmill head 13 will rotate out of the wind to align with the new position of lever 30.

The mechanism provided to accomplish this control consists of a shaft 32 supported in a bearing 33 which is part of the vane 28. A pin thru the shaft slides in a spiral groove which is part of a tube 34 supported by a bearing 35 which is also part of the vane 28. A key prevents rotation of the tube 34. A thrust bearing 36 is held in contact with a spider 37 which slides vertically as guided by the outside diameter of the lower support 14. The spider 37 is pinned to three push rods 40 passing thru holes in bosses of the flange of 14 as shown in additional detail in FIG. 4. The push rods 40 are held in aligned vertical position by links 41, levers 42, and two parallel shafts 43 and 44 which are supported in bearings 45 and 46 shown in FIG. 5. The shafts 43 and 44 are aligned by levers 47 and a link 50 and positioned by a link 51, lever 52 and a control 53. The control is of conventional design to operate power plant equipment. It can be responsive to windmill speed, vibration, storage temperature or a manual signal as required for safe operation of the windmill. A housing 54 matching the streamlined shape of the vane 28 is shown enclosing, and as part of, the windmill head 13.

The high speed shaft of the gear set 11 is connected to the low speed shaft of a second geared speed increaser 55 by a lightweight stiff shaft 56. The gear set 55 is of conventional design employing either spur gears or helical gears depending on economic considerations. It includes a friction brake and positive dog type locking device operated by a manual control 57 to prevent rotation of the windmill when work is to be done on it. The gear set 55 is mounted on the underside of the roof of the base 2. It in turn both supports and drives a centrifugal compressor at 60. The compressor is of conventional design. It is designed to require the same power as that developed by the windmill when driven at a speed determined by the windmill and the ratio of the two gear sets.

The compressor forces an elastic fluid through a discharge pipe 61, an orifice 62, an insulated heat storage tank 63 and back to the compressor inlet through a strainer 64, pipe 65 and a flow control 66. Mechanical energy delivered to the compressor is converted to heat, and velocity in the orifice is reduced entirely to heat by passing through channels in a heat storage material 67 shown herein as bricks. As the temperature of the circulating air and heat storage material increases, the air will become less dense and the compressor will require less power to rotate at a given speed. The flow control 66, shown in detail in FIG. 6, is provided to correct the compressor power input requirements for temperature. The control 66 consists of a set of streamlined vanes 69 supported in bearings of a cylindrical housing 70 and a central spider 71. The vanes are rotated in unison by a set of links and levers shown generally as 72, and shown in FIG. 1 to include a link 75 and a ring where the lead line of numeral 66 is located, and the ring and levers 72 are shown pinned together, or by similar means depending on the manufacturer. The vanes in the upper half of FIG. 6 are shown aligned with air flow to have little influence upon it. The vanes in the lower half of FIG. 6 are shown rotated to deflect the air and cause it to rotate or spin in the direction of rotation of the compressor impeller. This decreases the effective rotational speed of the compressor. An automatic temperature-responsive control 73, of conventional design, sensitive to temperature in the heat storage tank, is connected by an output lever 74 and link 75 to position the vane rotation levers 72. The entire system is adjusted when the circulating air temperature is at or near maximum by means of windmill blade angle, selection of size of orifice 62 and resistance to air flow of the heat storage material 67, so that with the flow control vanes in line with air flow, compressor input power is equal to power developed by the windmill at all operating speeds. The relation between rotational speed and wind velocity is recorded along with other values. In a subsequent test, with temperature of the storage and circulating system near minimum, the control 73 is adjusted to rotate the vanes 69 so that the relation between rotational speed and wind speed is as near as possible the same as at high temperature with the vanes straight. The range of the control 73 is adjusted to position the vanes 69 gradually between the two test positions as temperture changes over the test range.

The means of delivering heat will depend on the location of the windmill and storage tank in relation to the place of use of the heat. If the storage tank is within a space to be heated, leakage, through insulation around it, is recovered and the insulation can be less expensive. If the storage tank is within or near the space to be heated, hot air can be removed from it to mix with air in the space and be replaced in the circulating system by cool air from the space. Safety precautions must be taken to mix the hot air with air in the heated space. As shown in FIG. 7, a pipe 80 extends from inside the heat storage tank 63 to a blower 81 through a flow control 82, sensitive to temperature in the space to be heated. The blower 81 is driven by a motor 83 which also drives a larger capacity blower 84 circulating air through the heated space. The blower 82 discharges hot air from the storage tank to a diffuser 85 in the outlet of blower 84 to be mixed with air circulated in the space being heated. A quantity of air equal to that extracted by the blower 81 will return to the storage tank through the properly connected pipe 86. If the tank is within the heated space, the pipe 86 will be short. The pipes 80 and 86 must open into the heat storage tank 63 at locations separated from each other but which are at the same pressure regardless of variations in compressor speed, when the valve of the flow control 82 is closed. With the openings in these locations, variation in wind velocity will not change the delivery of heated air and readjustment of the flow control 82 will not be required following a change in wind velocity.

Heat can be transmitted to heat spaces distant from the storage tank and to other uses such as an absorption system to cool space in summer and to heat service water for home or industrial uses, by a liquid and vapor system such as water and steam. An evaporating surface 90 within the storage tank is shown connected to a separation drum 91. Steam from the drum is delivered via pipe 92 to a heat exchange surface 93 to heat air circulated by the blower 84. Condensed liquid is returned through pipe 94 and a pump 95 to the drum 91. If all elements of the steam delivery system are above the drum, the pump is not required.

The steam delivery pipes 92 and 94 can be extended to connect to a steam driven turbo-generator shown in FIG. 7. Steam flow to the turbine 100 is controlled by a throttle valve 101 and an inlet valve, shown generally as 102. The turbine exhausts to a condenser 103 where steam remaining in the exhaust is condensed by a cooling medium passing through the surface 104 and returned to the drum 91. An asynchronous generator 105 is shown driven by the turbine because this type of generator requires no excitation equipment and can be connected to deliver power without being synchronized with the line. A speed switch 106, driven by the generator, develops a signal at or slightly above synchronous speed of the generator, to close a contactor 107 connecting the generator to a three phase power service. A control 110 sensitive to either generator speed or output, operates through lever 111, link 112 and lever 113 to position the inlet valve 102 as required. Electric power can be generated by this steam, or an equivalent system, either when the wind is blowing or when there is no wind. The energy of several windmills can be converted to power by a common generating set. If the heat rejected by the turbine can be used in a process, the efficiency of the application will be improved.

Electric power can be generated with thermal efficiency and low capital cost when the wind is blowing, by a gas turbine generator set. FIG. 8 shows a gas turbine 120 with its inlet connected to the discharge connection 61 of the compressor 60, exhausting to the inlet of the compressor 65. The valve 121 in a turbine bypass 122 connecting to the orifice 62 is closed when wind velocity is low so that the entire circulating flow of air passes through the turbine. The generator 123 driven by the gas turbine can be of any type. An asynchronous generator is shown because of its low cost and the simple control required. When the wind velocity increases to drive the generator at or slightly above synchronous speed, a speed switch 124 will develop a signal to close a contactor 125 connecting the generator to a three phase power service. Whenever the wind velocity decreases to unload the generator, the speed switch or a reverse current element in the contactor 125 will cause it to open, disconnecting the generator from the line. When wind velocity increases to where the turbine drives the genertor at approximately 105% synchronous speed to develop maximum output, a current transformer 126 and control 127 will gradually move the lever 130, link 131 and lever 132, to open the valve 121 permitting gas to bypass the turbine, as required to limit output of the generator to its designed maximum. Either leakage past the bypass valve 121 or a small orifice in the disc will permit enough air to circulate through heat storage tank to prevent excessive temperature in the restricted compressor, turbine circuit. Mechanical loss in the turbine will be recovered as heat in storage so that efficiency of power generation will be high. With the addition of the turbo-generator described, the electric power output of a given diameter windmill can equal that of a windmill designed to drive a generator only at nearly constant speed with the advantage that the energy of higher velocity winds from the start of power generation to maximum load wasted by the speed control system and on to the maximum safe velocity can be recovered as heat.

The energy of wind is proportional to the cube of wind velocity. In order to recover the maximum possible percent of wind energy, a windmill must have one or more blades twisted so that each airfoil section enters the wind relative to it at the optimum angle of attack for that section. Meeting this condition at winds of both low and high velocities, requires that the blades be rigidly fastened to a horizontal shaft which will rotate at variable speeds proportional to wind velocity. The torque transmitted to the shaft will be proportional to the square of wind velocity and the power proportional to the cube of both wind velocity and rotational speed. A load connected to the windmill shaft must absorb power in this same relation to rotational speed to permit the windmill to rotate at optimum speed and recover the maximum possible energy from the wind. Either a centrifugal pump circulating liquid in a closed path or a centrifugal elastic fluid compressor circulating gas of constant density in a closed path, will require driving power proportional to the cube of rotational speed and when driven thru a speed increaser of optimum fixed ratio, will be a matching load for a properly designed windmill.

A centrifugal compressor has been described in this invention but all requirements of the invention would be equally satisfied by a windmill driving a centrifugal pump, and item 60 is a centrifugal machine, being either a compressor or a pump.

The centrifugal compressor described in this invention will convert the mechanical energy recovered by the windmill from the wind, to heat, and will generate a velocity and pressure difference in the working fluid. Inexpensive static devices can convert pressure difference to velocity and then to heat wherever desired to replace fossil fuel presently used. Depending upon economic factors related to diameter of the windmill, the velocity and pressure difference generated in the compressor can be converted to mechanical energy to drive an electric power generator, by a gas turbine, with the advantage that the loss in the gas turbine and the energy of high winds in excess of that required by a generator of economic rating, can be recovered as heat.

In addition to the recovery of the maximum energy from the wind, this invention provides means of storage so that heat can be delivered as required regardless of the intermittent nature of the wind. This is in contrast to windmills driving generators where a system supplied with wind power must include provision for standby power.

In summary, a practical windmill will have twisted airfoil blades rigidly attached to a disc on the horizontal low speed shaft of a bevel gear speed increaser. The output shaft will extend downward to connect to the input shaft of a second speed increaser. This arrangement permits rotation of the windmill head to face the wind with minimum machinery in the structure so rotated. The centrifugal compressor impeller is mounted on the output shaft of the second gear set and the compressor casing is supported by this gear case. The compressor discharges air in a closed circuit to an insulated heat storage tank filled with carefully planned layers of heat storage material, such as brick, where both velocity and pressure difference are converted to heat. Air is returned to the compressor thru a screen to protect it and a flow control to automatically compensate for changes in density of the circulated air with temperature, as described herein.

The temperature of the storage system and the air in the circulating system will increase at a rate determined by the capacity of the storage system per unit of temperature change and the balance between inflow of energy from the windmill and delivery of heat to places of use. Maximum storage temperature is limited only by the strength of heated materials used to construct the particular system. Because low alloy steels can be heated to 600 degrees F. without excessive reduction in strength, this temperture is a practical maximum for a practical windmill heat storage system.

Heat can be delivered from the system, when and as it is needed, by a variety of means. The simplest is to extract hot air from the closed circuit and replace it with an equal weight of cooler air, using care to mix the hot air at the place of use. A system in which a liquid is vaporized by stored heat can deliver heat considerable distances. It can also energize cooling means to either cool or heat space or for industrial processes. One or several windmills can supply steam to a conventional turbo-generator to provide both power and exhaust heat in a large installation.

It may be found economic especially with windmills of 100' diameter and larger to provide a gas turbine generator set to convert velocity and pressure difference developed by the compressor, to electrical energy. Electric power output would be comparable to that of a presently designed windmill of equal diameter driving a generator at nearly constant speed, with the advantage that energy of the wind discarded to obtain constant generator speed would be recovered as heat by the windmill of this invention.

The most economical presently-known generation of power is where the equivalent of heat rejected by the turbine and used in a process must otherwise be provided by burning fuel. As generating units become larger, conditions permitting this economy seldom obtain. Windmills on the contrary must be disbursed to prevent interference between them, and can be economically adapted to supply both heat and electric power.

FIGS. 9 and 10 show another embodiment of a windmill having two blades 140, of airfoil section, carried in fixed angular position on a flange 141 which is part of the input shaft of a geared speed increaser 142. Helical gears 143 and 144 provide a first increase in speed, and bevel gears 145 and 146 provide a second increase and drive a vertical output shaft 147. The shaft extends down thru the center of a support 148 to drive an air brake shown generally as 150. The gear set 142 and the windmill are supported on a frame 151 which rotates on the support 148, by a combined journal and thrust bearing 152 and a journal bearing 153. A light-weight fairing 154 encloses the gear set and a similar fairing 155 encloses the frame to smooth the flow of wind to the windmill.

Windmills driving either the brake of FIG. 11 or the equivalent transmission of FIG. 12, must be protected from overspeed both to prevent damage to the windmill and to prevent overload of the speed increasor. FIG. 10 shows the two blades 140 carried on the flange 141 of the gear set, by journal bearing assemblies, 215, and by combined journal and thrust bearing assemblies, 216. The feathering axis of the blade in the bearings 215 and 216 is separated from the rotational axis of the windmill.

The entire windmill and support are mounted on a reinforced concrete box 156 on the ridge of a strong "A" frame house 157. The air brake 150 is within the house 157 and is protected from weather, and leakage of heat thru the insulation 186 shown in FIG. 11 and covering brake 150 is recovered to help heat the house. Insulated pipes 158 and 159 extend from the brake 150 and respectively conduct hot and cool air to and from a storage vessel, such as that shown in the other embodiment at 63 in FIG. 1. Also, as in the FIG. 1 embodiment, the embodiment of FIG. 9 would have pipes connected with the storage vessel and leading to the dwelling or the like, again as with pipes 80 and 86 of FIGS. 1 and 7.

FIG. 11 shows detailed construction of the air brake 150. An impeller 160 can be attached to the flanged lower end of the shaft 147. It is of low cost construction, purposely designed for poor efficiency in moving air. The shaft 147 is supported by a ball bearing 161 mounted in the bracket 162 which is shown attached to the lower end of support 148. This bracket 162 and a housing 163, which is shown bolted to it, enclose the impeller 160 and create a closed path for circulation of air. Air leaving the impeller 160 flows down thru the closed path shown as annular passage 164, and the air flows inward and thru the variable flow area defined between a valve seat 167 and a control valve 165 which moves on and off the seat 167. A grid 166 straightens flow of air thru the shown inlet passage defined by the valve seat 167, and the air flows back to the impeller.

The position of valve 165 is fixed during normal changes in wind velocity to maintain the cubed relation between rotational speed and power input to the brake impeller 160, required to match the power output of the windmill. As there is no pressure difference across the impeller 160 when it is stationary, only frictional torque is required of the windmill to start rotating it. The antifriction bearings with labyrinth seals carry all shafts of the rotating system so that they also require little torque to start rotation. The windmill will therefore start at minimum wind velocity. It will accelerate the brake 150 thru an operating range of speeds limited only by the physical strength of the windmill, brake, gear set and connecting shafts. Thus, rotation of the impeller 160 causes the air to circulate in the enclosed housing 163 and to thereby heat that air in the enclosed housing by molecular friction. Some of that heated air is delivered to the storage vessel 63 through the pipe 158 or 159.

A cylindrical projection 170 of the bracket 162 is spaced with respect to the flanges of 147 and 160 to form a labyrinth seal at 168. Blades 169, secured to the shaft 147, combine with a baffle 171, which is part of the bracket 162, to circulate cool air over the shafts and so reduce flow of heat to the bearing 161.

When hot air from the storage system is to be mixed with large quantities of air circulating thru a house to heat it, heat can be supplied from storage until temperature of the storage material drops to 100 or 150 degrees F. If heat is to be delivered as steam to a nearby house or to energize an absorption cooling system, the minimum storage temperature will be 225 degrees F.. Maximum storage temperature is limited only by the materials used to construct the system. A low-cost system constructed of common sheet steel will be limited to 600 degrees F. maximum storage temperature.

The density of air at 600 degrees F. is approximately half that at 100 degrees F. The valve 165 is movable up and down within a guide 185 which is shown to be part of the housing 163, and the valve 165 is movable to open and close, and must be repositioned to maintain constant power input with respect to rotational speed of the impeller 160, during the gradual change in temperature of the brake and storage system. A control to accomplish this function is shown to consist of, a bellows 172 and seat 173, held against the bottom of chamber 174 by a compression spring 175. The spring seat 176 has an arm which carries a lever 177 on a shaft 178. The lever connects the bellows seat 173 to the control valve 165 by means of a link 179 and pins 180, to position it as required. Hot air from passage 164 flows into a passage 181 and around the housing defining the chamber 174, to heat the chamber. The air returns to the impeller inlet thru pasage 182, space 183 and holes 184. Fluid in the chamber 174 will expand when heated to move the bellows 172 against the force of the spring 175, to incrcoese flow area between seat 167 and valve 165 as temperature of gas circulating thru the brake increases. The housing 163 has an interior wall structure shown in FIG. 11 defining the space 183 and the passage 164 and being disposed immediately below the impeller 160.

FIG. 12 shows a transmission and generator designed to load a large windmill. The power input impeller of the transmission is identical in principle to that of the brake. Starting torque is zero at standstill and the power required to drive it will increase in cubed relation to rotational speed. The windmills can be similar in design and support. The selection of windmill load to provide only heat or both heat and electric power will depend on economic consideration of the home or industry it is to supply energy to.

An impeller 200 of maximum efficiency, is attached to the vertical gearset output shaft 147, as was the low efficiency impeller of the air brake. The valve 165 and seat 167 of the brake 150 are replaced by an efficient inflow gas turbine impeller 201, driving a generator 202. The passage 203 between impellers is defined by the interior wall structure shown adjacent passage 203 and includes turning vanes to obtain maximum efficiency of air flow. An asynchronous generator is shown at 202. This low-cost type of generator can be connected to a three-phase power line by a simple control switch 204 at 100 to 101% rated speed. A tachometer generator 205 connected to the main generator, supplies a speed related signal to the switch 204. A reverse current element of the switch 204 will open the generator circuit whenever wind velocity decreases to unload the generator 202.

A control 206 consisting of a watt sensor model G.E. 5120, servo-amplifier model AD 8540 and linear actuator model LA 1100 all manufactured by Jordon Controls Inc. of Milwaukee, Wisconsin the output of the control assembly, as mechanical motion, will open successive valves 207 to bypass air from passage 203 thru holes 208 to the inlet of impeller 200. Simultaneously, vanes part of the valves 207, will move into the passage 203 to maintain both maximum rated flow to the turbine and constant effective flow area with respect to the impeller 200 when wind velocity exceeds that at which the generator 202 delivers rated power output.

A control 209, equivalent to 73 of FIG. 1, will position a set of vanes 210 located at the inlet of impeller 200, aligned with air flow when the temperature of the circulating air is maximum. As circulating air temperature decreases, the control 209, will rotate the vanes 210 to spin air entering the impeller in the direction of impeller rotation as required to maintain designed power input in relation to rotational speed. This means of control will compensate for changes in density of the circulating gas with minimum decrease in transmission efficiency.

Current design and manufacture can produce both power input impellers 200 and turbine impellers 201 of 87% efficiency to obtain an overall transmission efficiency of 75%. Possible applications which require large quantities of heat in relation to power, may be most economically served by a system including a less expensive, lower efficiency transmission.

Provision to remove heat, generated in the transmission as steam, is shown. Any equivalent means can be employed. Tubing 211, bonded thermally to the outside wall of the transmission, will receive water from a drum 212, evaporate all or part of it and return the mixture to the drum. Steam will be separated from water in the top of the drum and piped thru connection 213 to any required use. Condensate will return to the drum thru connection 214.

FIG. 13 is a curve and FIG. 14 is a table of data showing rotational speed of a specific windmill 32 feet in diameter and the power it can deliver to an air brake in relation to wind velocity.

FIG. 15 is a curve and FIG. 16 is a table of data showing rotational speed of a specific 200 foot diameter windmill and the power it can deliver to a transmission, input power to the generator and heat generated in the transmission in relation to wind velocity. Values of power are given in Kw. and of heat in equivalent Kw so that energy values can be added.

The rapid increase in energy recovered from winds of high velocity is shown by both curves. When heat is the only output of the windmill, as shown by FIG. 13, the same size of brake will load a given windmill at all wind velocities within a safe operating range. The only part of a system increasing in cost with operating wind velocity is the speed increasing gear set. When a windmill drives a generator to convert mechanical energy first to electricity and then to heat, cost of the generator will also increase with increase in the designed maximum operating speed. Thus the system using a brake to convert mechanical energy directly to heat can be economically designed to recover the energy of winds at a higher velocity than can an equivalent system with a windmill driving a generator.

When a windmill drives a generator thru a pneumatic transmission as shown in FIG. 12, electric power output shown by the curves of FIG. 15 will be less than that of a windmill of equal diameter designed for maximum efficiency at rated load driving a generator directly at constant speed. However, energy lost in the transmission driving a generator, is recovered as heat. Increased capacity of only the speed increasing gear set will permit low-cost recovery of energy as heat from winds of higher velocity than winds corresponding to the economic maximum rating of the generator.

A governing system must be provided to continually feather the blades of a constant speed windmill to recover maximum energy from winds throughout the operating range as well as at maximum operating wind velocity, to limit generator load to its maximum rating. A governing system of a variable speed windmill driving either the brake or pneumatic transmission, need feather the blades only at overspeed to prevent damage to the speed increaser. This governor can be less sensitive to speed change, cost less and, because it will operate infrequently, last longer than the governor or a windmill driving a generator at constant speed.

A windmill of any diameter according to this invention will recover more total energy from winds of a given geographical location and will cost less than existing windmills of comparable diameter.

What is claimed is:

1. A windmill system for recovering energy from the applied wind in proportion to the cube of the wind velocity, comprising a rotationally supported shaft, blades mounted on said shaft, a centrifugal gas-filled machine including a rotatably mounted blade impeller, an enclosed housing surrounding said impeller, said housing having an interior wall structure defining a gas-flow inlet for said impeller, said interior wall structure and said housing being spaced apart and defining a gas-flow passage located radially beyond said impeller blades and in gas-flow communication with said inlet and with said structure and said housing presenting said inlet for circulating the gas to and from said impeller blades and along said passage, a flow restrictor operative adjacent said inlet for controlling the flow of working fluid passing along said passage, a non-clutched rotational drive means operatively connected between said shaft and said machine continuously at rotational speeds in direct proportion to all the rotational speeds of said shaft for uniform increase of the mechanical energy required to rotate said impeller in proportion to the cube of rotational speed of said impeller and for loading said windmill shaft for rotation at speeds directly proportional to the velocity of applied wind and for recovering maximum energy from the wind and for converting the said mechanical energy applied to rotate said impeller to heat energy by fluid friction in the gas in said gas-filled machine, heated gas reception means, and gas-flow conduits connected in gas-flow communication with said machine and said reception means for delivering to said reception means heated gas generated by said machine.

2. The windmill system as claimed in claim 1, wherein said flow restrictor is adjustable, and heat-sensitive means operatively connected with said flow restrictor and being in communication with the gas in said machine, for automatically adjusting said flow restrictor to maintain a constant relation between the energy absorbed by said machine and the rotational speed of said impeller, at all temperatures of the gas in said machine.

3. The windmill system as claimed in claim 1, wherein said housing includes a gas outlet, and said conduits including a first fluid-flow conduit in fluid-flow communication with said outlet and said reception means for removing heated gas from said machine, and said conduits including a second fluid-flow conduit in fluid-flow communication with said inlet for returning an equal mass of gas to said machine without changing the relation between mechanical energy required to drive said impeller and the rotational speed of said impeller.

4. The windmill system as claimed in claim 1, wherein said reception means contains a liquid which receives the heat conducted to said reception means.

5. The windmill system as claimed in claim 1, wherein said gas-flow passage defined by said housing and said wall structure is circuitous, said flow restrictor is a gas turbine impeller rotationally supported and having a gas inlet and a shaft, an electric power generator connected with said impeller shaft and being driven thereby, a valve in fluid-flow communication with said turbine impeller to bypass gas from said inlet of said turbine impeller to said inlet of said bladed impeller and simultaneously increase resistance to the flow of gas to said turbine, a load sensor connected with said generator and said valve and being responsive to the load on said generator for controlling the position of said valve and thereby control the load on said generator for maintaining the mechanical energy required to drive said impeller in proportion to the cube of rotational speed of said impeller.

6. The windmill system as claimed in claim 5, wherein a set of vanes is located adjacent said inlet to said bladed impeller, and heat sensitive means disposed to be in communication with the gas in said machine, and with said vanes being angled to impart a rotational component to the velocity of gas flowing to said impeller for maintaining a constant relation between the energy absorbed by said machine and the rotational speed of said impeller with minimum loss of efficiency in moving gas along said passage.

* * * * *